Nov. 20, 1928.
D. W. BAKER
1,692,432
CORN POPPING MACHINE
Filed May 19, 1927
7 Sheets-Sheet 1
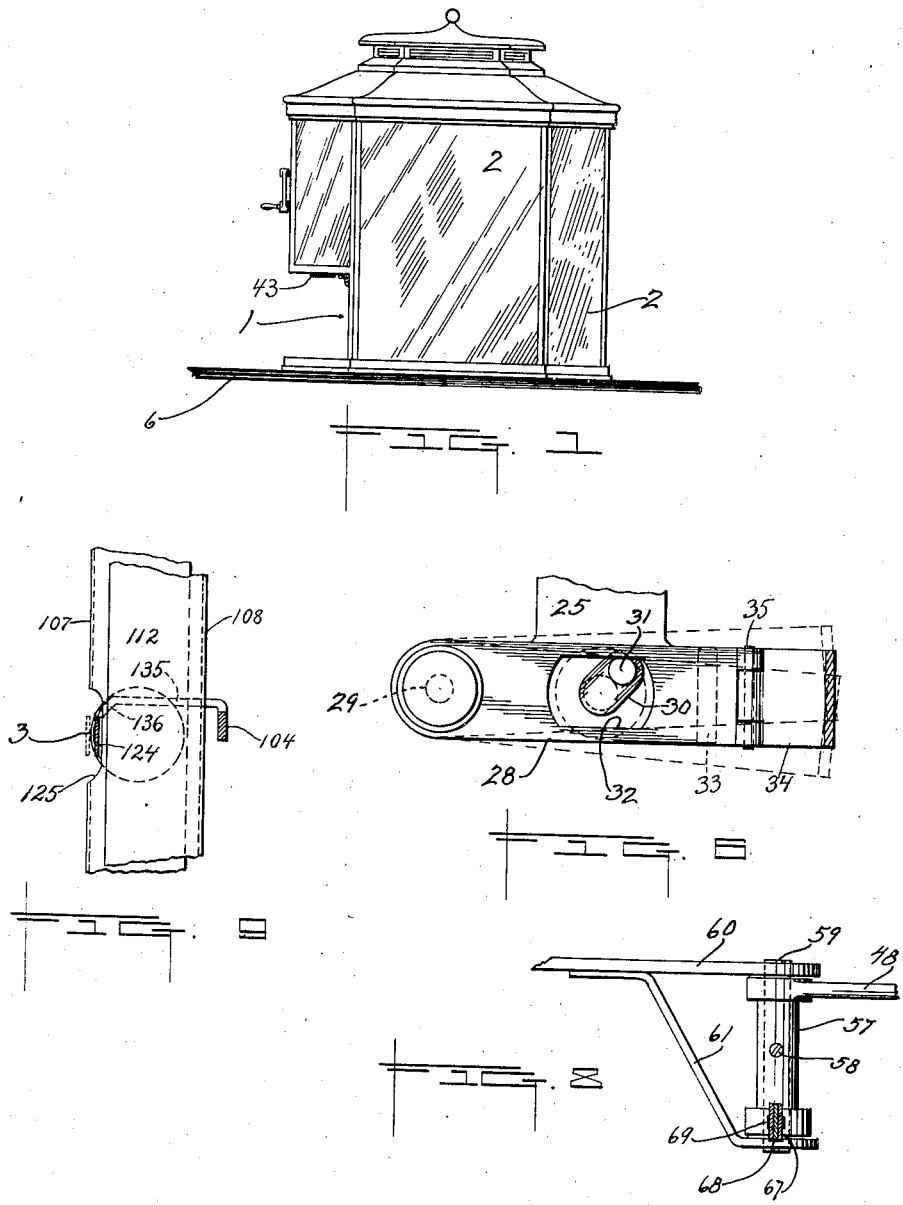
DANIEL W. BAKER,
INVENTOR.
BY
ATTORNEY.

Nov. 20, 1928.
D. W. BAKER
1,692,432
CORN POPPING MACHINE
Filed May 19, 1927
7 Sheets-Sheet 2
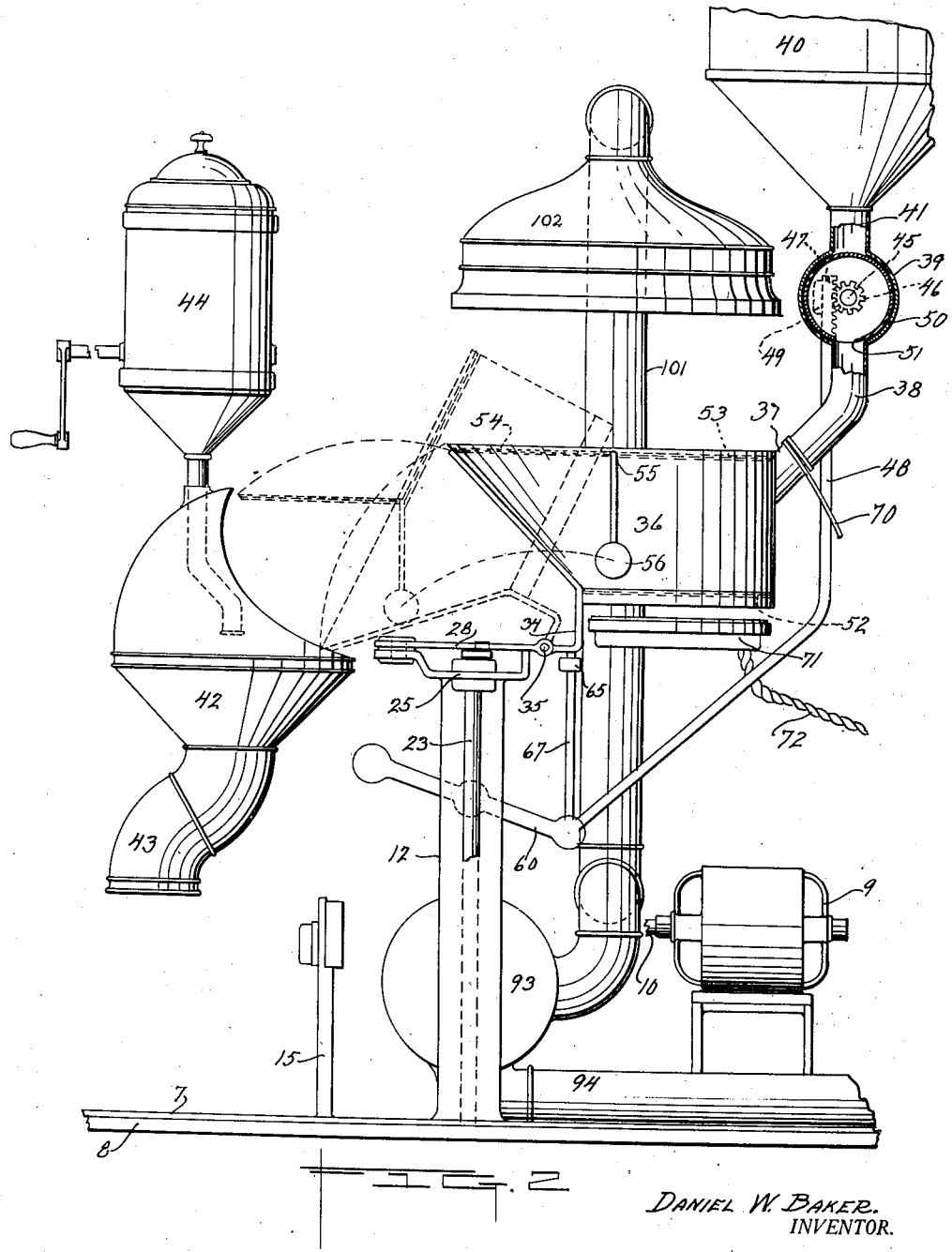
DANIEL W. BAKER.
INVENTOR.
BY
Harry Schroeder
ATTORNEY.

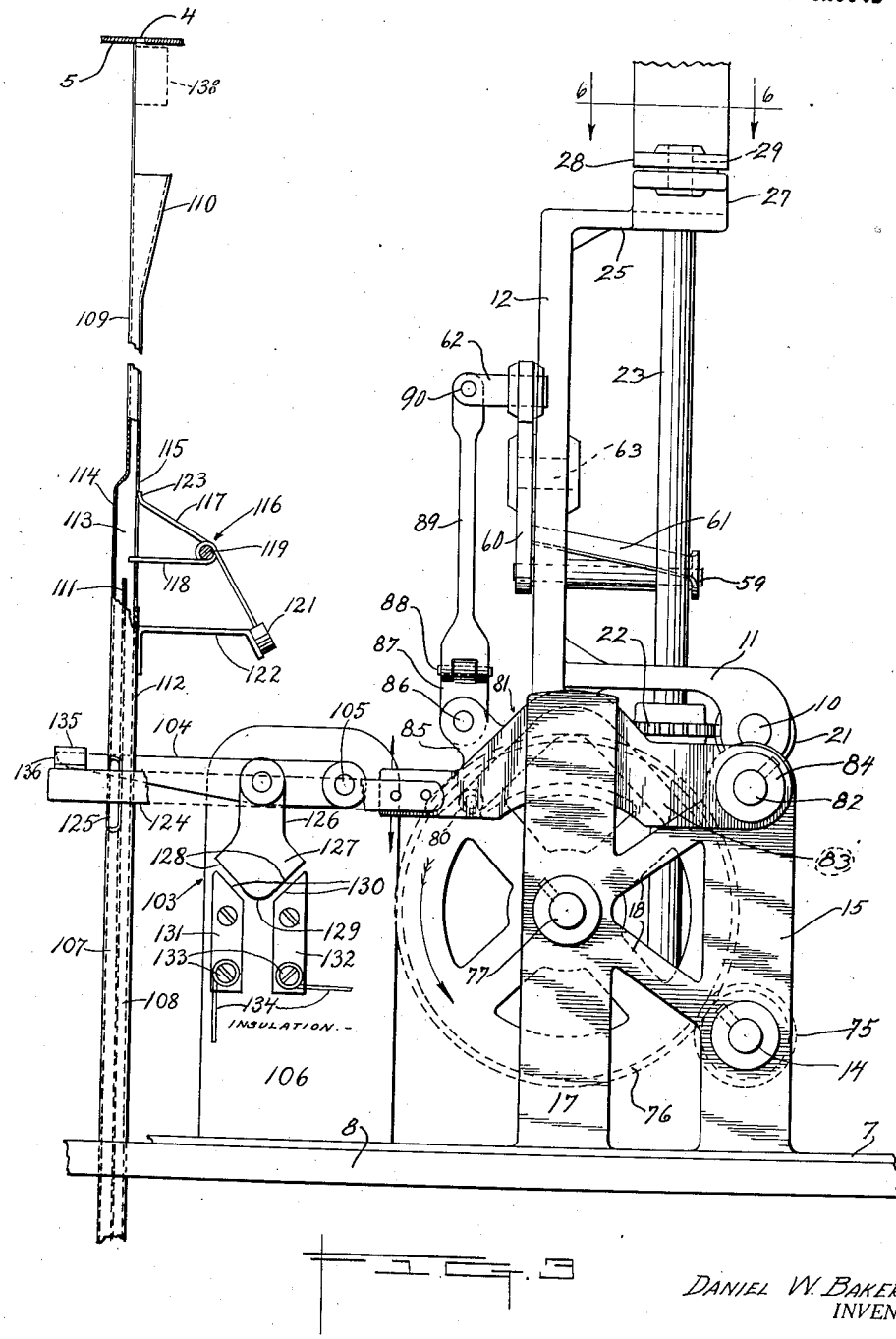

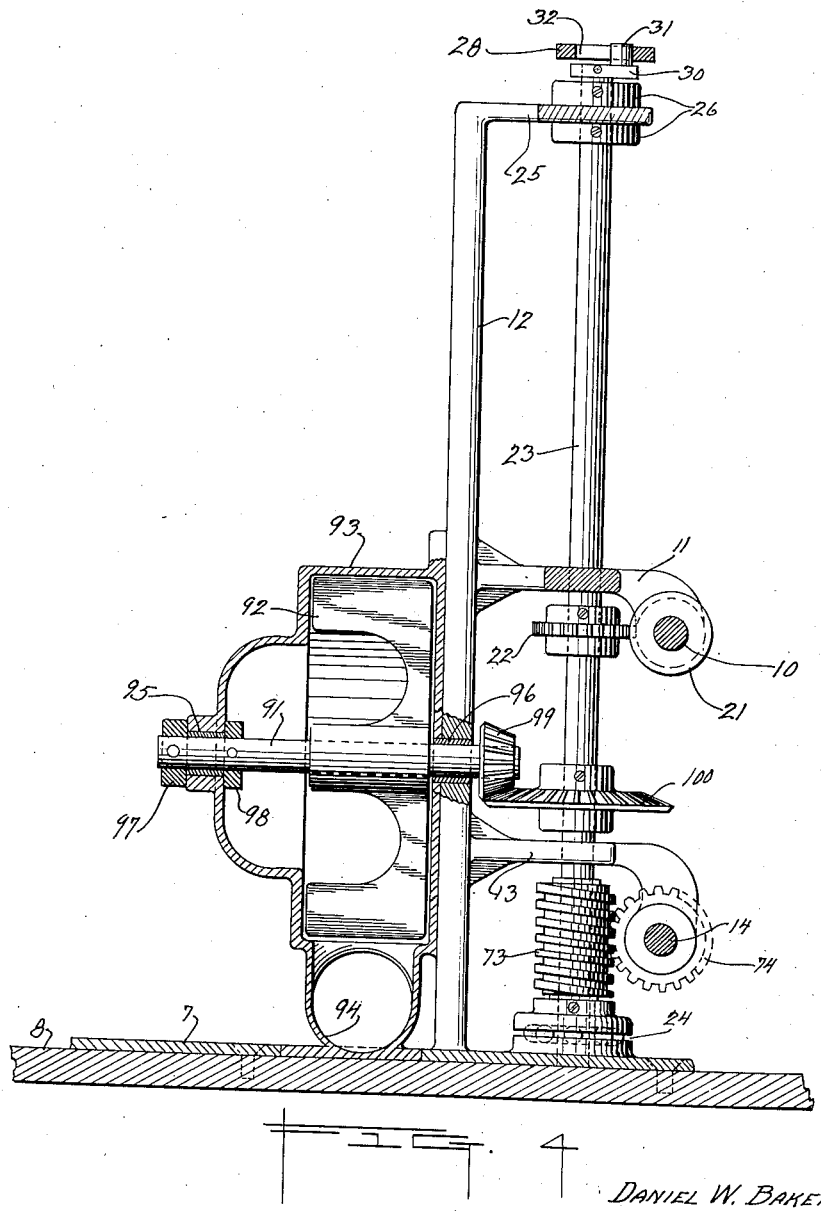

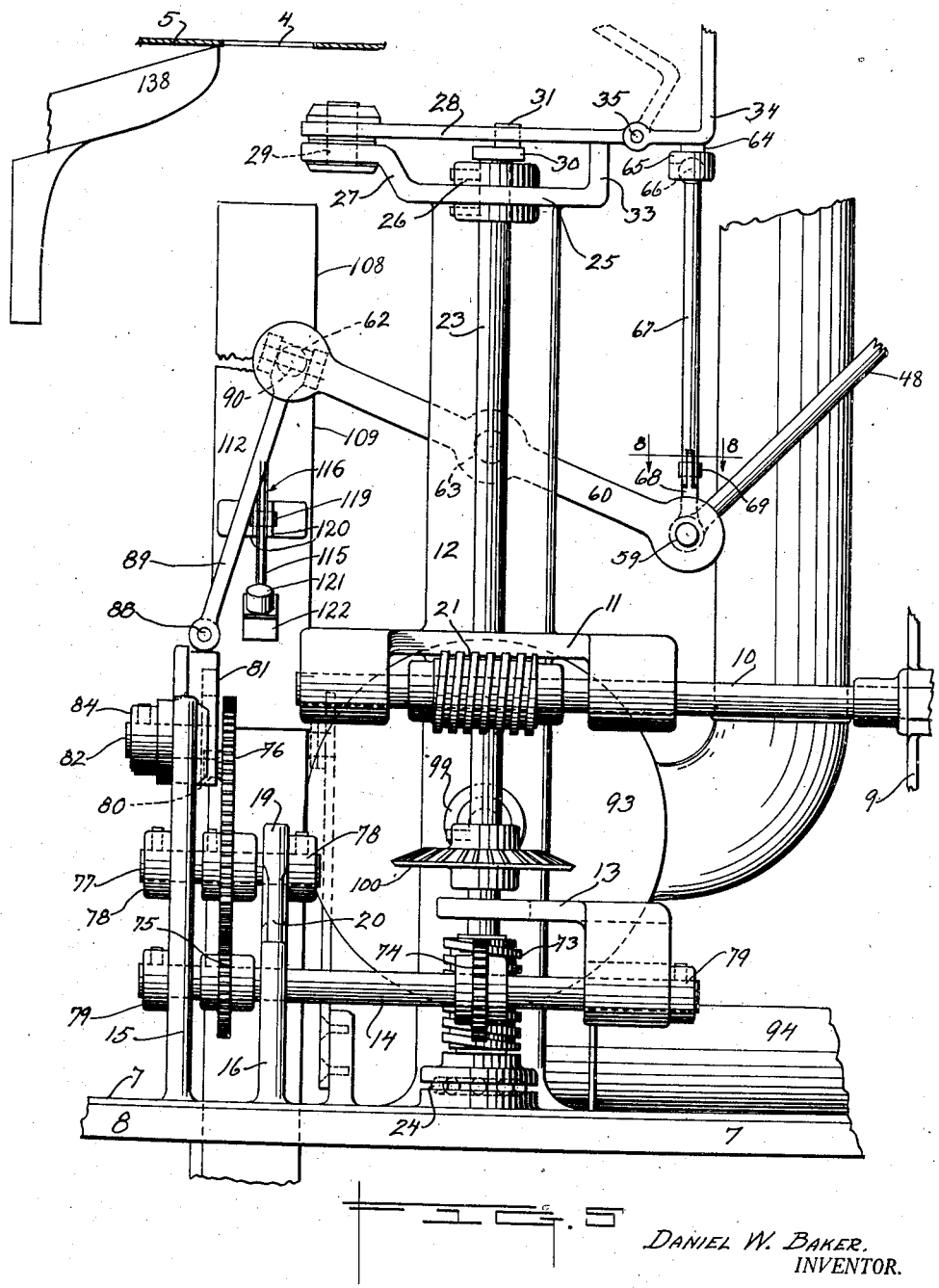

Nov. 20, 1928.
D. W. BAKER
1,692,432
CORN POPPING MACHINE
Filed May 19, 1927    7 Sheets-Sheet 6
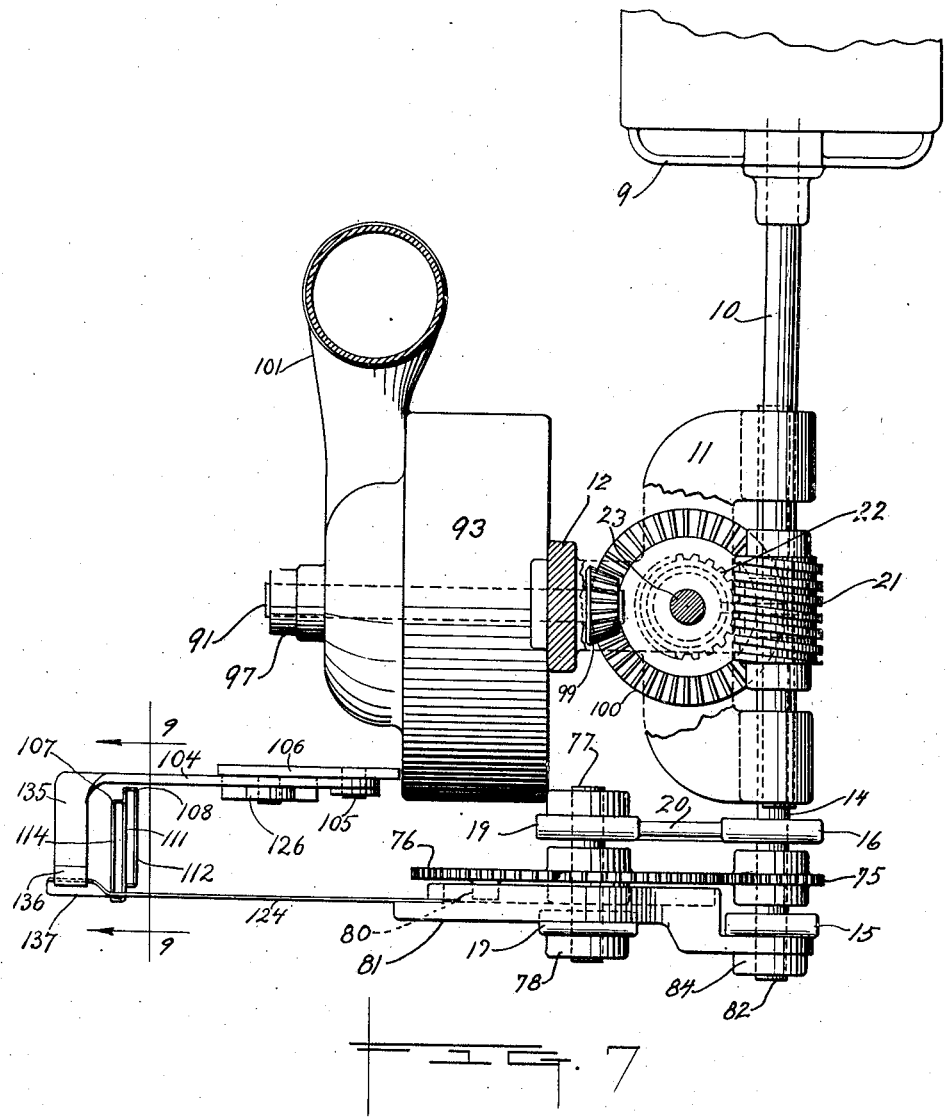
DANIEL W. BAKER.
INVENTOR.
BY
ATTORNEY.

Nov. 20, 1928.
D. W. BAKER
1,692,432
CORN POPPING MACHINE
Filed May 19, 1927
7 Sheets-Sheet 7
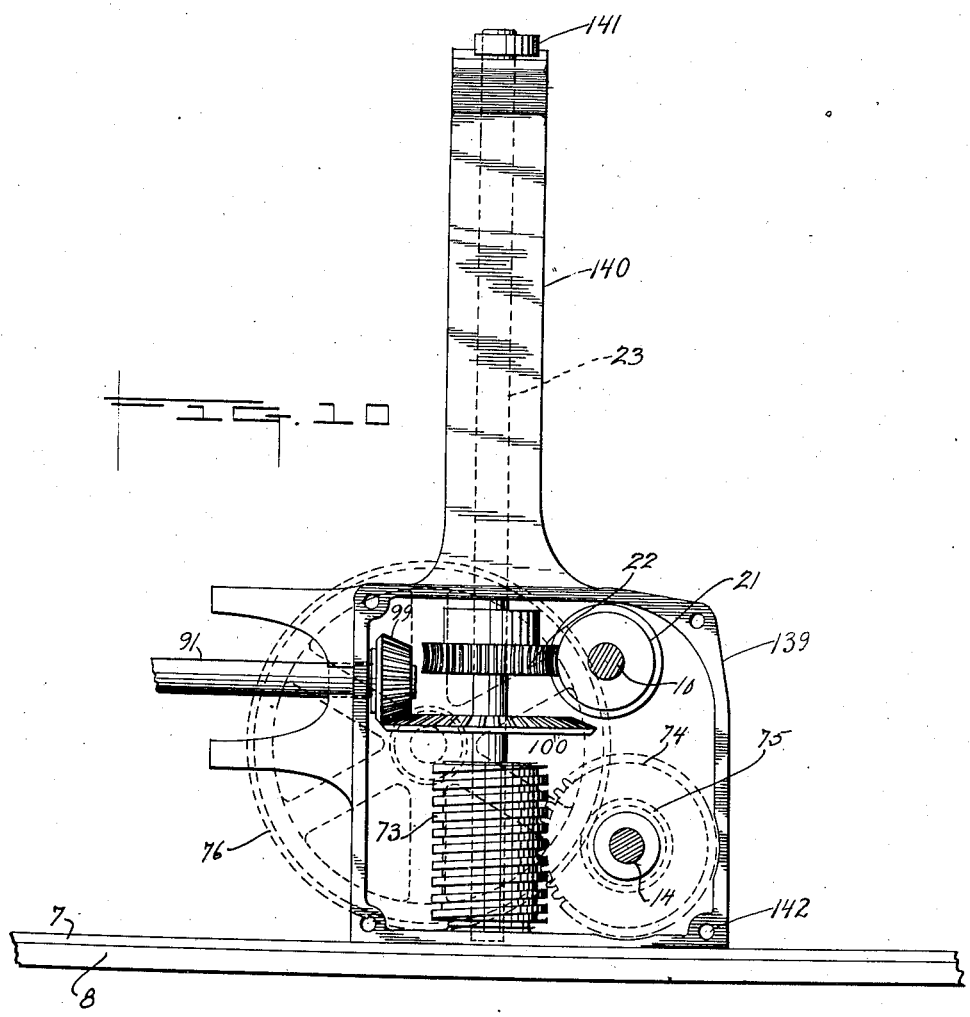
DANIEL W. BAKER.
INVENTOR.
BY
ATTORNEY.

Patented Nov. 20, 1928.

1,692,432

UNITED STATES PATENT OFFICE.

DANIEL WEBSTER BAKER, OF OAKLAND, CALIFORNIA, ASSIGNOR, BY DIRECT AND MESNE ASSIGNMENTS, OF ONE-FOURTH TO DOMINICK JOHN COLLINS, ONE-FOURTH TO GEORGE BETTANDORFF, BOTH OF OAKLAND, CALIFORNIA, AND ONE-FOURTH TO HARRY C. SCHROEDER, OF CONCORD, CALIFORNIA.

CORN-POPPING MACHINE.

Application filed May 19, 1927. Serial No. 192,518.

My invention relates to machines, which upon the deposit of a coin are adapted to deliver goods of a certain kind to a customer, and it refers especially to a machine of this character which is adapted to vend popped corn or other grains to a customer.

One object of my invention is to construct a machine which automatically pops corn or other grain and automatically ejects a predetermined quantity thereof within a predetermined period.

Another object of the invention is to provide novel, coin-controlled means for operating a machine of this character, so that the machine can be set in operation only by the deposit therein of a coin of a predetermined denomination.

An additional object of the invention is to provide a machine of this character with a receptacle for corn or other grain adapted for popping and with means for automatically heating the grain in the receptacle and for automatically ejecting the grain therefrom as popped, and also to provide a machine with means for automatically agitating the grain during the heating process and at the time of its ejection from the receptacle in order to cause a uniform roasting of the grain and to insure the ejection of all the grain from the receptacle.

A further object of the invention is to provide a machine of this character with means for automatically removing chaff, dust, or other foreign particles from the grain during the operation of the machine in order to deliver the popped grain in a pure condition to the customer.

A still further object of the invention is to construct a machine of this character so that corn or other grain deposited therein is prevented from being touched by human hands or from being otherwise contaminated during the operation of the machine in order to avoid possible communication of disease conditions with the popped grain delivered to a customer.

With the above mentioned objects and other objects in view, my invention consists in the novel construction and combination of parts hereinafter described, illustrated in the accompanying drawings, and set forth in the appended claims, it being understood that various changes in the form, proportion, size, and minor details of construction within the scope of the claims may be resorted to without departing from the spirit, or without sacrificing any of the advantages of, the invention.

In the drawings:

Figure 1 is a side elevation of the automatic corn-popping machine of my invention enclosed in a casing of a preferred form, the casing being shown as mounted upon a support.

Figure 2 is a general, somewhat diagrammatic elevation of some of the important parts of the machine, the outer casing being removed therefrom.

Figure 3 is an elevation of the coin-operated mechanism for starting the machine and of the means for stopping it and also shows part of the mechanism for operating the grain-measuring device and the agitating device for the grain receptacle in which the grain is heated, the coin chutes being partly broken and partly in section in order to show the coin-selecting means therein.

Figure 4 is an elevation of the suction fan and the vertical shaft and its mounting and shows the connection between the vertical shaft and the motor shaft, the shaft for the suction fan and the shaft for communicating motion to the gears by which the cam lever for stopping the motor is lifted, the housing, in which the suction fan is mounted, being shown in section, and the agitating arm for the grain receptacle also being shown sectionally in order to make clear how the eccentric pin at the upper end of the vertical shaft engages the slot in the agitating arm.

Figure 5 is an elevation of a portion of the motor for the machine, the vertical shaft and its connection with the motor, the suction fan, the cam lever for stopping the motor, and the agitating means for the grain receptacle. The view further illustrates the tilting means for the grain receptacle, a portion of the arm for the operation of the grain-measuring device, the operating connections of the grain receptacle and the measuring device with the cam lever, and the coin-receiving and coin-selecting means. A portion of the top of the outer casing for the machine is in section in order to show the coin-deposit slot, and a portion of the magnet, which diverts the deposited pieces of magnetically attracted materials from the coin-receiving chute, are also shown.

Figure 6 is a plan of the agitating arm for the grain receptacle, the pivotal fastening, and the support for the arm. The view is taken in a plane indicated by the line 6—6 in Figure 3 and intersecting the upward directed portion of the bracket by which the agitating arm is pivotally connected with the grain receptacle.

Figure 7 is a plan, showing a portion of the motor, the suction fan, the coin chutes, the coin-operated means for closing the motor circuit and the circuit for the grain-heating element, the cam lever, and the connections between the motor and the cam lever for lifting the latter so as to effect the opening of the circuits in a predetermined period. The view is taken sectionally of the suction pipe for the suction fan and of the vertical shaft and also sectionally of the standard, which carries the supporting bracket for the motor shaft, the supporting bracket being broken in order to show the bevel-gear connection between the vertical shaft and the suction fan.

Figure 8 is a plan of a portion of the lever, which is connected with the cam lever and is instrumental in imparting a tilting motion to the grain receptacle and a turning movement to the grain-measuring device, the rack-carrying arms connected with the measuring device being broken, and the arm for tilting the grain receptacle being shown sectionally in a plane indicated by the line 8—8 in Figure 5 in order to disclose the pivotal connection by which the arm is movable transversely to the tilting lever.

Figure 9 is a side elevation of those portions of the coin chutes at which a coin of the proper denomination effects the closing of the circuits for starting the operation of the machine. The view is taken sectionally of the cam lever spring and of the circuit-closing lever in the plane indicated by the line 9—9 in Figure 7, and a coin is also shown in the chute provided with the cut-out portion as forcing the cam-lever spring sidewise to the dotted-line position in which it allows a downward swinging movement of the circuit-closing lever.

Figure 10 is an elevation of a modified arrangement of the principal gears in the machine within a grease-containing housing, the cover for the housing being removed, and the view also showing the standard for the vertical shaft as integral with the housing.

In the present preferred embodiment of my invention of an automatic corn-popping machine, I mount the operating parts of the machine in a suitable casing 1, which may be of any pleasing design and is preferably provided with transparent side walls 2 so that a customer may enjoy watching the operation of the machine while he is waiting for the delivery of the quantity of popped corn for which he has deposited a coin 3 in a coin-deposit slot 4, shown in Figures 3 and 5, in the top 5 of the case. Of course, it is understood that although the machine is principally intended for popping corn, it may be used in connection with the popping of other grain, such as rice, for instance, in order to vend a predetermined quantity of the popped grain to a customer. The case 1 may be a part of a counter or mounted and supported upon the top 6 of a counter in a store, such as a grocery store or a meat market, where there sometimes is a vacant space, so that this space may thus be used at a profit to the store keeper and with a minimum loss of time to him and his employees in vending popped corn to a customer while the customer may be waiting for other service in the store.

I preferably provide the machine with a base plate 7 which, when the machine is fitted in the case 1, is secured to the floor 8 thereof. Upon this base plate is suitably mounted a motor 9 connected in circuit with an electric source, not shown, and provided with a shaft 10, which extends from one end of the motor and is journaled in bearings in a bracket 11, secured to or integral with a standard 12, and another bracket 13 is also secured to or integral with the standard below the bracket 11 and is provided with a bearing for one end of a shaft 14, substantially parallel with the motor shaft 10. At its other end, the shaft 14 is journaled in a bearing in a vertical support 15 and also preferably has a bearing therefor in another vertical support 16 between the support 15 and the bracket 13, and both supports 15 and 16 are preferably integral with the base plate 7 or otherwise firmly secured thereto. The support 15 is aligned, and preferably integrally connected, with another vertical support 17 by struts 18, and a vertical support 19 is similarly aligned, and integrally support with, the support 16 by struts 20, connected with, the support 16 by struts 20, so that, in fact, each pair of supports, 15, 17, and 16, 19, may be considered as a unitary supporting member.

Between the bearings in the bracket 11, the motor shaft 10 has secured thereon a worm 21. This worm engages a worm wheel 22, fixed upon a vertical shaft 23, which extends thru the brackets 11 and 13 and is provided with a thrust bearing 24 at the base plate 7 and is also journaled near its upper end in a bracket 25, preferably integral with the standard 12 and extending from the top thereof. Collars 26, one above and one below the bracket 25, are secured upon the vertical shaft and cooperate with the thrust bearing 24 for preventing the shaft from moving endwise.

The bracket 25 has integral therewith at one side an extension 27, which is preferably formed so that its free end is raised above the level of the uppermost collar 26, and an arm 28 is with its end pivotally mounted upon this free end of the bracket extension, as shown at 29. At its upper end, the vertical shaft 23 has suitably fixed thereon a crank 30 provided with a pin 31, and the arm 28 has therein an elongated opening 32, which is adapted to receive therein the crank pin 31, but is of a width considerably greater than the thickness of the crank pin, as is clearly shown in Figure 5, so that, when the vertical shaft revolves, an oscillative, jerky movement is imparted to the arm 28. On the side opposite to the extension 27 the bracket 25 has integral therewith another extension, which terminates in an upward limb 33 adapted to support on its top the arm 28 near the end thereof opposite to the pivotal connection 29. To this opposite end of the arm, a bracket 34 has one end pivotally secured, as shown at 35, so that the bracket 34 is thereby adapted to swing over the arm 28. The bracket 34 is preferably bent upward and has suitably secured thereto and supported thereon a receptacle 36 for such corn or other grain as is to be popped.

At its top and opposite to the pivotal connection 35 with the arm 28, the receptacle 36 is provided with a tube 37, which is directed obliquely upward and adapted to convey the grain into the receptacle from a pipe 38 leading upward into a cylindrical housing 39, and this housing in its turn is connected at its top with a suitably shaped grain hopper 40 by a pipe 41. On account of being secured to the bracket 34, the receptacle is adapted to swing upon the pivot 35 for emptying the grain in the receptacle into a discharge hopper 42, connected with a delivery conduit 43. This discharge hopper may have associated therewith a device 44 of any suitable construction for mixing butter or other food elements with the discharged grain.

A shaft 45 is journaled in the end walls of the cylindrical housing 39 and has secured thereupon at one end a pinion 46, and a rack 47, formed upon the upper end of an arm 48, is held in mesh with the pinion by any suitable guide means, indicated at 49. Wtihin the cylindrical housing 39 is a grain-measuring device 50, which conforms to the shape of the cylindrical housing and is with its end walls concentrically secured to the shaft 45 so as to rotate therewith in the housing when the rack 47 is actuated. This device has in its cylindrical wall an opening 51, adapted to register with the pipe 41 for filling the device with a predetermined quantity of grain from the hopper 40, and to register with the pipe 38 for emptying this quantity of grain thereinto.

Although the grain receptacle 36 may be variously constructed, I prefer to make it of a cylindrical formation at its connection with the tube 37, and of a conical formation at its discharge end. A screen 52 is suitably secured so as to form the bottom of the receptacle, while screens 53 and 54 form the top thereof, the screen 53 being suitably secured to the receptacle and extending from the cylindrical portion so as to form approximately one half of the top, and the screen 54 constituting the other half but preferably being secured to a rod 55, which extends adjacent to the screen 53 rotatably thru the side of the receptacle and is on the outside of the receptacle bent downward and at its end provided with a counter-weight 56, adapted to hold the screen 54 in a virtually horizontal position, so that, when the receptacle is swung toward the discharge hopper 42, as is indicated by dotted lines in Figure 2, the top of the receptacle is opened sufficiently for allowing a free discharge of the grain from the receptacle into the hopper, and, when the receptacle is in its normal position, the screens 53 and 54 prevent any of the grain from jumping out of the receptacle during the popping process. For the purpose of imparting a longitudinal movement to the rack 47, the arm 48 is suitably formed and is at its lower end fixed to one end of a sleeve 57, which extends transversely to the arm 28, and the sleeve is preferably removably secured by a set-screw 58 upon the shaft 59, which at one end is journaled in one end of a lever 60 and at its other end is journaled in one end of a bracket 61, secured at its other end to the lever, as shown in Figure 8, the other end of the lever being pivotally connected with a wrist pin 62, and the lever being preferably somewhat frictionally fulcrumed at a suitable intermediate point to the standard 12, as shown at 63. In order to swing the grain receptacle 36 from its normal position, the bracket 34 has thereon a downward extending stud 64, which is at its lower end provided with a universal-joint housing 65 for holding therein a ball member 66 at the upper end of an arm 67, so that the arm is thereby adapted to follow the movement of the bracket 34, when it is swung upon its pivot 35, and to follow the oscillating movement of the arm 28 upon its pivot 29, and, at the end opposite to the end fixed to the arm 48, the sleeve 57 is provided with a projection 68, which at its upper end is so pivotally joined to the arm 67, as shown at 69, that, during the swinging movement of the lever 60, the arm 67 also is free to oscillate upon its pivot 69 transversely to the arm 28, while, by the sleeve's fixed relation to the shaft 59, the arms 67 and 48 are adapted to simultaneously follow the swinging movement of the lever 60.

The grain receptacle 36 is so secured to the bracket 34, and the rack 47 so engages the pinion 46 that, when the receptacle is swung to the discharge position at the hopper 42, as indicated by dotted lines in Figure 2, the opening 51 in the grain-measuring device 50 is in registration with the pipe 41, thus causing the grain from the hopper 40 to move by gravity into, and to fill, the measuring device. Upon the return movement of the receptacle to its normal position, as shown in full lines, or even as soon as the opening 51 begins to register with the pipe 38, the grain in the measuring device passes into the latter pipe but is prevented from entering the tube 37, before the receptacle reaches its normal position, by a plate 70, which is secured to the end of the tube and extends therefrom so as to swing past, and just clear the end of, the pipe 38 during the swinging movement of the receptacle. As soon as the tube 37 begins to register with the pipe 38, the grain from the measuring device is free to descend into the receptacle 36, below which is suitably mounted an electric heating-element 71, connected in circuit by wires 72 with a suitable source of electric energy, which preferably is the same as that for the motor 9.

When the motor is running, the vertical shaft 23 is rotated at a considerably slower rate of speed than the motor shaft 10 by means of the engagement of the worm wheel 22 with the worm 21 but sufficiently quickly for causing a proper, jerky and oscillative, lateral movement of the arm 28 by its engagement with the crank pin 31 and for communicating this lateral, jerky movement to the receptacle 36 while the receptacle is in its normal position, so as to agitate the grain therein thoroughly and thus to effect a thorough and uniform roasting thereof, and also while the receptacle is in its tilted positions, so as to insure the ejection of all the grain in the receptacle into the discharge hopper 42. While thus by the means described the rotation of the vertical shaft effects a thorough agitating of the grain in the receptacle, the vertical shaft simultaneously therewith causes rotation of the shaft 14. For this purpose the vertical shaft has secured thereon a worm 73, engaging a worm wheel 74, fixed upon the shaft 14, which also has fixed thereupon between the bearing supports 15 and 16 a gear wheel 75. This gear wheel in its turn meshes with a larger gear wheel 76, secured upon a shaft 77, which is rotatably mounted in bearings in the vertical supports 17 and 19, collars 78 and 79 being respectively provided on the ends of the shafts 77 and 14 in order to assure a proper endwise play for the free running of the shafts. Toward the vertical support 17 the gear wheel 76 has on its face a pin projection 80, and a lever 81, which is at one end rotatably mounted on a pivot 82, extending through and fixed in the vertical support 15 at the top thereof, is in its side provided with a cam groove 83, in which the pin 80 is adapted to travel during a part of the revolution of the gear wheel 76. This groove presents a path, which is in the general shape of an inverted V in order to effect a downward swinging movement of the lever, when the pin engages the groove and moves toward the apex thereof, and an upward swinging movement of the lever, when the pin in the groove moves away from the apex, the direction of the revolution of the gear wheel 77 being indicated by the curved arrow thereon in Figure 3. A collar 84 retains the cam lever 81 upon the pivot 82, and the lever is further prevented from a lateral movement away from the gear wheel 76 by the vertical support 17 at the outer side of the lever, so that the lever's engagement with the pin 80 is thereby assured. Upon the cam lever and at the top thereof is a projection 85, which is slotted in the lengthwise direction of the lever and has pivotally fitted in the slot, as shown at 86, the lower end of a link 87, and the upper end of this link is hinged, as shown, at 88, to the lower end of an arm 89, so that the arm is thereby adapted to swing transversely to the cam lever, while by the pivotal connection 86 the arm is free to swing longitudinally of the cam lever. At its upper end the arm 89, as shown at 90, is pivotally connected with the wrist pin 62 in the lever 60 so that the arm is free to swing transversely to and from the lever. By means of its connections with the cam lever 81 the lever 60 is thus adapted to follow the swinging movement of the cam lever and thereby simultaneously to move the arms 48 and 67, and, consequently, to cause a partial rotation of the grain-measuring device 50 simultaneously with the swinging movement of the grain receptacle 36 upon the pivot 35.

In order to prevent chaff, dust or other foreign particles from being carried with the popped grain to the discharge hopper 42, a virtually horizontal shaft 91 has suitably secured thereon a suction fan 92 within a housing 93, which is preferably integral with the standard 12 and has its outlet pipe 94 formed integral with the base 7, as shown in Figure 4, the shaft being rotatably journalled in and extending through bearings 95 and 96 in opposite sides of the housing, and collars 97 and 98 being secured upon the shaft at the respective ends of the bearing 95 for preventing an excessive end play of the shaft. At its end toward the vertical shaft 23, the shaft 91 has fixed thereon a bevel gear 99, which meshes with a larger bevel gear 100, secured upon the vertical shaft, so that the shaft 91 is adapted to revolve at a considerably greater speed than the vertical shaft in order to assure an efficient action of the suction fan. The fan housing 93 is connected by its inlet pipe 101 to the top of a hood 102, which is mounted at a suitable distance above the grain receptacle 36 and is suitably shaped at its open bottom, so that, during the operation of the machine, the suction from the fan 92 will cause the foreign particles to be drawn from the receptacle and through the screens 53 and 54 at the top thereof upward through the hood and thence through the inlet pipe 101 into the fan housing 93 and therefrom through the outlet pipe 94 to any suitable discharge place, not shown.

In order to close or open the circuits for the electric motor 9 and the electric heating-element 71, I provide a coin-controlled switch means, which is indicated in general at 103 and includes a circuit-closing lever 104, pivotally secured at one end, as indicated at 105, upon a block 106 of a suitable insulating material. This block may be fixed in any suitable manner upon the base plate 7 of the machine so that the lever 104 extends on one side of and beyond chutes 107 and 108, forming lower parts of a unitary chute 109, and being adapted to extend through the base plate and through the floor 8 of the case 1 and to lead therefrom to suitable receptacles, not shown.

At its upper end the chute 109, which is arranged virtually vertically below the slot 4 in the case, is preferably provided with an upward flaring portion 110 for receiving such coins 3 as are dropped into the slot. The chutes 107 and 108 preferably have a common inner wall 111, and the chute 108 is preferably aligned with the chute 109, and a side wall 112 of the chute 108 opposite to the wall 111 is also common to the chute 109 and to a coin-selecting chamber 113, which at its top opens into the latter chute and at its bottom opens to both of the chutes 107 and 108 and from its top widens downward so that a side wall 114 thereof opposite to the wall 112 also is common to the chute 107 and forms an outer side wall thereof opposite to the inner wall 111. In the wall 112 is a slot 115, which extends longitudinally of the coin-selecting chamber and partly below the top of the chutes 107 and 108, as determined by the height of the inner wall 111, and a coin-selecting member 116, provided with legs 117 and 118 arranged at an angle to each other, is pivotally mounted in any suitable manner, preferably by being fixed on a pin 119, which extends pivotally through brackets 120, secured to the wall 112, so that the legs are adapted to swing freely in the slot. A light counterweight 121 is also secured to the pin 119 or in any other manner so as to constitute a part of the coin-selecting member, and the wall 112 may have attached thereto a bracket 122, against the free end of which the counter-weight is adapted to abut for holding the member in its normal position. The leg 117 is provided with a hook-shaped end 123, which, when the member 116 is in its normal position, preferably rests within the slot 115 but does not extend through the wall 112, so that a coin 3, descending into the coin-selecting chamber 113 from the chute 109, may be allowed to pass the hook, while the leg 118 is formed with a straight end portion and extends a distance below the hook sufficiently far through the wall 112 for obstructing the passage of the coin to the chute 108. A coin, thus pressing upon the end of the leg 118, will overbalance the weight 121 and thereby cause the coin-selecting member to swing upon its pivot, so that, while the leg 118 is being withdrawn from the slot, the hook 123 on the leg 117 is forced inward. If a legitimate coin thus presses upon the end of the leg 118, the hook 123 forces the coin toward the wall 114 in the coin-selecting chamber and directly above the chute 107, into which it falls by its own weight and through which it is led to the receptacle therefor. Again, if a perforated coin or a washer has been deposited in the slot 4 and reaches the leg 118, the hook 123 passes through the coin or washer, and the inclined position of the leg 117 causes the coin or washer to gravitate upon that leg toward the wall 112 until the coin-selecting member has been swung sufficiently far for the coin or washer to be passed at its lower edge between the walls 111 and 112. After the coin or washer has reached the latter position it continues on account of its weight to swing the member until the hook 123 clears the wall 112 and thereby allows the coin or washer to pass down through the chute 108 to its receptacle, which, if so desired, may be outside of the case 1 or the counter upon which the case is supported in order to return the rejected coin or washer to its depositor.

To the cam lever 81 and at the free end thereof is fixed a flat spring 124, which extends on the sides of the chutes 107 and 108 opposite to the lever 104 and beyond the chutes and is adapted to be sprung laterally of the cam lever and normally has a portion positioned within a cut-out part 125 of the chute 107, so that, when a legitimate coin, which by the means described has been allowed to enter the chute 107, passes the cut-out part 125, the spring 124 is deflected by the coin from the chute but resumes its normal position as soon as the coin has passed the lower edge of the spring. While thus a legitimate coin in the chute 107 causes a lateral movement of the spring 124, a coin or a washer, rejected by the means described and passing through the chute 108, will have no influence upon the spring, the latter chute for this purpose being receded from the cut-out part 125, as shown in Figs. 7 and 9.

In its intermediate portion the circuit-closing lever 104 has pivoted thereto the upper end of a contact member 126, which at its lower end is somewhat enlarged so as to constitute a weight 127, adapted to aid the lever in its downward swinging movement. The weight is formed with contact edges 128, which converge downward and are joined by a rounded portion 129. When the circuit-closing lever is swung to its extreme downward position, the edges 128 are adapted at their entire length to contact with the top edges 130 of contact members 131 and 132, suitably secured upon the insulation block 106 and in a spaced relation, so as to be properly insulated from each other, and provided with screws 133 for securing the terminal wires 134 whereby the electric motor 9 and the heating element 71 are connected with the source of electric energy.

A wing 135 extends laterally from the free end of the circuit-closing lever toward the free end of the spring 124. This wing has thereon a downward inclined end portion 136, the extremity of which is adapted to rest upon the top edge of the spring when the cam lever 81 is in its normal position, as shown in Fig. 3, thus holding the circuit-closing lever raised so that the contact member 126 is out of contact with the contact members 131 and 132, and no current can therefore flow to the motor 9 or the heating element 71. However, as soon as a coin 3 in the chute 107 forces the spring 124 outward as indicated in dotted lines in Fig. 9, the wing is released from its engagement with the spring. The circuit-closing lever, aided by the weight 127, immediately swings downward until the edges 128 of the weight contact the edges 130 of the contact members 131 and 132, thus closing the circuits for the motor and the heating element and simultaneously causing the wing to assume a position below the end of the spring 124 and thereby to permit the spring to snap back into the cut-out portion of the chute and into alignment with the inclined end portion of the wing. In order to lift the circuit-closing lever from its circuit-closing position the spring must be swung downward so as to assume a position below the wing. For the purpose of accomplishing this movement smoothly and easily the spring has at its free end and at the bottom edge thereof a wing portion 137, which extends laterally from the spring and away from the wing 135, preferably at an inclination corresponding with the inclined portion 136 of the latter. Thus, when the cam lever is swung downward, the inclined portions of the wings 135 and 137 come into engagement with each other, the spring thereby first being forced laterally and then, upon clearing the inclined portion 136, being snapped back so that the end of the spring is again directly below the end of the wing 135.

It is evident from the foregoing description that a legitimate coin 3 of the proper denomination, after having been inserted in the slot 4 in the top 5 of the case 1, automatically starts the operation of the corn-popping machine, and it is also clear that washers or perforated coins are rejected and fail to effect the closing of the circuits for the motor 9 and the heating element 71, and consequently fail to set the machine in motion. In this connection, it should be noticed that a coin, which is of a smaller diameter than that required and has been passed by the coin-selecting member 116 into the coin chute 107, will also fail to close the electric circuits, because it is not capable of forcing the spring 124 laterally so as to clear the inclined portion 136 of the wing 135 on the circuit-closing lever. To the loss of its depositor, such a coin will therefore be led to the receptacle for the legitimate coins without having caused the machine to operate. In order also to prevent the machine from being started by the depositing of iron disks or other pieces of magnetically attracted materials in the case 1, I secure under the top 5 of the case and at one end of the slot 4 a magnet 138, which is sufficiently strong and suitably shaped and inclined for drawing the inserted pieces toward it and out of a vertical alignment with the flaring portion 110 of the chute 109. A receptacle, not shown, may be provided in a suitable place in the case 1, so that such pieces, after rolling along the magnet, will be caused to drop into the receptacle.

The combination of parts, as already described, is also embodied in the modification of the machine shown in Fig. 10, with the exception that a housing 139, integral with the base plate 7 or in any suitable manner fixed thereto, is provided. This housing encloses the principal gearing of the machine and is adapted to be filled with a suitable lubricant in order to cause the machine to run smoothly and noiselessly and thus to obviate the inconvenience of a too frequent attention to the proper working of the machine. In this instance a standard 140, which is shown as extending integrally from the top of the housing, is substituted for the standard 12 and is at its upper end similarly constructed for rotatably supporting the vertical shaft 23 therein and for pivotally supporting the agitating arm 28 thereon. As an additional deviation from the construction previously described, the shaft 23 may have eccentrically fixed thereon at its upper end a disk 141, which, like the crank pin 31, is adapted to work in the slot 32 for causing an oscillative, jerky movement of the agitating arm. A suitable cover, not shown, is removably attachable to the housing by bolts, extending through holes in the cover and into registering, threaded holes 142 in the housing, so that a ready access is thereby obtained to the interior of the latter.

When the corn-popping machine, thus described, is not in operation, the grain receptacle 36 is held so that its screen bottom 52 is in a virtually horizontal position directly above the heating element 71 by means of the receptacle's connection with the frictionally fulcrumed lever 60 and the latter's connection with the cam lever 81, which, as a result of the engagement of the pin 80 with a terminal portion of the cam groove 83, is forced to assume its normal, virtually horizontal position. The spring 124 is thus also held in its normal position with a portion within the cut-out part 125 of the coin chute 107. At the same time the receptacle has therein a measured quantity of grain, delivered from the device 50, which in its turn has the opening 51 in registration with the pipe 38, so that grain from the hopper 40 is thereby prevented from dropping into the device.

As soon as the spring 124 has been forced away from the cut-out part 125 by a coin dropped into the slot 4, and the circuit-closing lever 104 consequently begins to swing downward, the rounded portion 129 on the contact member 126, which is pendent between the edges 130 on the contact members 131 and 132, guides the pendent member, so that the contact edges 128 thereon come into a full-length contact with the contact edges 130, and therefore assure a positive closing of the circuits for the motor 9 and the heating element 71. The gear wheel 76 thus begins to rotate in the indicated direction, and the pin 80 leaves the terminal portion of the cam groove in the cam lever, while the agitating arm 28, by the means described, shakes the grain receptacle back and forth over the heating element, and the suction fan 92 at the same time sucks the chaff, dust or other foreign particles from the receptacle.

After the pin 80 has entered the upward inclined initial portion of the cam groove 83, it begins to swing the cam lever upward and also to lift the circuit-closing member 104 by means of the spring 124, until the contact member 126 is out of contact with the contact members 131 and 132 and the circuits for the motor and the heating element are thereby opened. At the same time the grain receptacle is by this action tilted toward the discharge hopper 42, and the grain-measuring device 50 is partly rotated so as to permit it to receive its full supply of grain from the hopper 40. Although the current for the motor is thus shut off, the momentum causes the motor to continue its rotation so that the pin 80 travels past the apex of the cam groove and begins to engage the downward inclined terminal portion of the groove, thereby forcing the cam lever to swing downward to its normal position and consequently to swing the grain receptacle back to its normal position, and also partly rotating the grain-measuring device so that it empties the measured quantity of grain into the receptacle. By the time the pin 80 reaches the end of the cam groove, as shown in Fig. 3, the momentum is spent and the machine stops. It is thus obvious that the machine automatically pops corn or other grain and automatically ejects a predetermined quantity thereof in the time it takes the gear wheel 76 to make a complete revolution.

Since the machine is principally intended to be used in a store, it is understood that a customer, before starting the operaton of the machine, may be supplied by the storekeeper or an employee in the store with a suitable receptacle, such as a paper bag, cup, or the like, for receiving therein the popped grain when it is ejected from the delivery conduit 43. For the convenience of the customer, the base plate 7 may extend outside of the case 1, as shown in Fig. 1, in order to provide a platform adapted to have placed thereon the receptacle directly under the opening of the delivery conduit, it being, of course, optional with the customer whether to operate the device 44 for mixing butter or other food elements with the ejected popped grain.

Although in the foregoing description the machine of my invention has been referred to as especially adapted for popping corn or other grain, the machine is obviously adapted for the roasting of other food elements, for instance, peanuts, and may, advantageously be used in connection with the roasting of coffee beans or other substances, which do not have a tendency to pop at the completion of the roasting process. The claims hereto appended should therefore be construed as referring to a machine adapted to subject various food elements or substances to a roasting process in the manner, and by the means, stated.

I claim as my invention:

1. In a machine for popping corn or other grain, a receptacle, means in operative relation to said receptacle for automatically heating the grain therein until the grain pops; and means for automatically vibrating said receptacle so as to cause a uniform roasting of the grain.

2. In a machine for popping corn or other grain, a receptacle, means in operative relation to said receptacle for automatically heating the grain therein until the grain pops; and means to automatically tilt said receptacle within a predetermined period for ejecting the popped grain.

3. In a machine for popping corn or other grain, a receptacle, means in operative relation thereto for automatically heating the grain therein; means to automatically tilt said receptacle for ejecting the popped grain therefrom; and means for automatically vibrating said receptacle while it is heated and at the time of the ejection of the grain so as to cause a uniform roasting of the grain and to insure the ejection of all the popped grain.

4. In a machine for popping corn or other grain, a receptacle, means in operative relation thereto for automatically heating the grain therein, means to automatically tilt said receptacle for ejecting the popped grain therefrom; means for automatically vibrating said receptacle while it is heated and at the time of the ejection of the grain so as to cause a uniform roasting of the grain and to insure the ejection of all the popped grain; coin-controlled means for starting the operation of the machine; and means for automatically stopping the operation of the machine when the popping process is finished.

5. In a machine for popping corn or other grain, a motor and a heating element connected with a source of electric energy; a grain receptacle mounted so that the grain therein may be heated by the element when the receptacle is in its normal position; means connecting the receptacle with the motor for causing a tilting movement of the receptacle so as to eject the grain therefrom at the completion of the popping process, and for swinging the receptacle back to its normal position after the ejection of the grain; means for closing the circuits to the motor and the heating element when the grain receptacle is in its normal position; and means operatively connected with the motor for opening the circuits shortly before the ejection of the grain from the receptacle.

6. In a machine for popping corn or other grain, a motor and a heating element connected with a source of electric energy; a perforated grain receptacle mounted so that the grain therein may be heated by the element when the receptacle is in its normal position; means for opening the receptacle by a tilting movement thereof so as to allow the ejection of the grain therefrom, and for holding the receptacle closed when it is in its normal position, so as to prevent the grain from jumping out of the receptacle during the popping process; means connecting the receptacle with the motor for causing the receptacle's tilting movement at the completion of the popping process and for swinging the receptacle back to its normal position after the ejection of the grain; means for closing the circuits to the motor and the heating element when the grain receptacle is in its normal position; and means operatively connected with the motor for opening the circuits shortly before the ejection of the grain from the receptacle.

7. In a machine for popping corn or other grain, a motor and a heating element connected with a source of electric energy; a grain receptacle provided with a perforated top and a perforated bottom and mounted so that the grain in the receptacle may be heated by the element when the receptacle is in its normal position; means for opening the top by a tilting movement of the receptacle, so as to allow the ejection of the grain from the receptacle, and for holding the top closed when the receptacle is in its normal position so as to prevent the grain from jumping out of the receptacle during the popping process; means connecting the receptacle with the motor for causing the receptacle's tilting movement at the completion of the popping process and for swinging the receptacle back to its normal position after the ejection of the grain; means for closing the circuits to the motor and the heating element when the grain receptacle is in its normal position; and means operatively connected with the motor for opening the circuits shortly before the ejection of the grain from the receptacle.

8. In a machine for popping corn or other grain, a motor and a heating element connected with a source of electric energy; a grain receptacle mounted so that the grain therein may be heated by the element during the operation of the motor; means operatively connecting the receptacle with the motor for causing an oscillative, jerky movement of the receptacle during, and at the completion of, the popping process; means for ejecting the grain from the receptacle at the completion of the popping process; means for closing the circuits to the motor and the heating element so as to start the popping process; and means operatively connected with the motor for opening the circuits shortly before the ejection of the grain from the receptacle.

9. In a machine for popping corn or other grain, a motor and a heating element connected with a source of electric energy; an operatively mounted grain-measuring device adapted to hold a predetermined quantity of grain therein and connected with a suitable source of grain supply; a grain receptacle mounted so that it is adapted to receive the quantity of grain from the measuring device and so that the grain in the receptacle may be heated by the element when the receptacle is in its normal position; means connecting the receptacle with the motor for causing a tilting movement of the receptacle, so as to eject the grain therefrom at the completion of the popping process, and for swinging the receptacle back to its normal position after the ejection of the grain; means connecting the measuring device with the motor for operating the device so as to receive the quantity of grain from the supply when the grain in the receptacle is ejected and to empty the grain in the device into the receptacle when the latter is swung back to its normal position; means for closing the circuits to the motor and the heating element when the grain receptacle is in its normal position; and means operatively connected with the motor for opening the circuits shortly before the ejection of the grain from the receptacle.

10. In a machine for popping corn or other grain, a motor and a heating element connected with a source of electric energy; a grain receptacle mounted so that the grain therein may be heated by the element during the operation of the motor; means for ejecting the grain from the receptacle at the completion of the popping process; a suction fan operatively connected with the motor and having an inlet opening adjacent to the receptacle so that the fan is adapted to remove foreign particles from the receptacle and to prevent them from being ejected with the popped grain; means for closing the circuits of the motor and the heating element so as to start the popping process; and means operatively connected with the motor for opening the circuits shortly before the ejection of the grain from the receptacle.

11. In a machine for popping corn or other grain, a motor and a heating element connected with a source of electric energy; a tiltable grain-receptacle mounted so that the grain therein may be heated by the element when the receptacle is in its normal position; a coin chute having a cut-out part therein, a cam lever having a groove therein; a spring extending from the cam lever and normally adapted to rest in the cut-out part of the coin chute; and insulated, gravity-actuated and circuit-closing lever adapted normally to rest on the spring; insulated contact-members respectively connected with the motor and the heating element, the spring being adapted to be deflected by a coin of a predetermined denomination, passing the cut-out part in the chute, so that the circuit-closing lever is allowed to swing downward and past the spring in order to contact the contact members and thus to close the circuits for the motor and the element; a wheel rotatably connected with the motor and having a projection thereon adapted to engage the groove in the cam lever, the groove being so formed, and the relation between the spring and the circuit-closing lever being such, that, when the projection passes in the initial portion of the groove, the cam lever is swung downward and allows the spring to snap back under the circuit-closing lever, and, when the projection passes in the terminal portion of the groove, the cam lever is swung upward and thereby causes the spring to lift the circuit-closing lever out of contact with the contact members so as to open the circuits; and means connected with the cam lever and co-operating therewith for causing a tilting movement of the grain receptacle, when the circuits are opened, so as to eject the grain from the receptacle, and for causing the receptacle to be swung back to its normal position immediately after the ejection of the grain.

12. In a machine for popping corn or other grain, a motor and a heating element connected with a source of electric energy; a tiltable grain-receptacle mounted so that the grain therein may be heated by the element when the receptacle is in its normal position; a coin chute having a cut-out part therein; a cam lever having a groove therein; a spring extending from the cam lever and normally adapted to rest in the cut-out part of the coin chute; an insulated, circuit-closing lever adapted normally to rest on the spring; a weighted contact-member pivotally secured to the circuit-closing lever and adapted to be pendent therefrom and to assist the circuit-closing lever in a downward swinging movement; insulated contact members respectively connected with the motor and the heating element, the spring being adapted to be deflected by a coin of a predetermined denomination, passing the cut-out part in the chute, so that the circuit-closing lever is allowed to swing downward and past the spring in order to cause the weighted contact-member to contact the insulated contact-members and thus to close the circuits for the motor and the element; a wheel rotatably connected with the motor and having a projection thereon adapted to engage the groove in the cam lever, the groove being so formed, and the relation between the spring and the circuit-closing lever being such, that, when the projection passes in the initial portion of the groove, the cam lever is swung downward and allows the spring to snap back under the circuit-closing lever, and, when the projection passes in the terminal portion of the groove, the cam lever is swung upward and thereby causes the spring to lift the circuit-closing lever out of contact with the contact members so as to open the circuits; and means connected with the cam lever and co-operating therewith for causing a tilting movement of the grain receptacle, when the circuits are opened, so as to eject the grain from the receptacle, and for causing the receptacle to be swung back to its normal position immediately after the ejection of the grain.

13. In a machine for popping corn or other grain, a motor and a heating element connected with a source of electric energy; a rotatably mounted grain-measuring device adapted to hold a predetermined quantity of grain therein and connected with a suitable source of grain supply; a tiltable grain-receptacle mounted so that it is adapted to receive the quantity of grain from the measuring device and so that the grain in the receptacle may be heated by the element when the receptacle is in its normal position; a coin chute having a cut-out part therein; a cam lever having a groove therein; a spring extending from the cam lever and normally adapted to rest in the cut-out part of the coin chute; an insulated, gravity-actuated and circuit-closing lever adapted normally to rest on the spring; insulated contact-members respectively connected with the motor and the heating element, the spring being adapted to be deflected by a coin of a predetermined denomination, passing the cut-out part in the chute, so that the circuit-closing lever is allowed to swing downward and past the spring in order to contact the contact members and thus to close the circuits for the motor and the element; a wheel rotatably connected with the motor and having a projection thereon adapted to engage the groove in the cam lever, the groove being so formed, and the relation between the spring and the circuit-closing lever being such, that, when the projection passes in the initial portion of the groove, the cam lever is swung downward and allows the spring to snap back under the circuit-closing lever, and, when the projection passes in the terminal portion of the groove, the cam lever is swung upward and thereby causes the spring to lift the circuit-closing lever out of contact with the contact members so as to open the circuits; and means connected with the cam lever and co-operating therewith for causing a tilting movement of the grain receptacle, when the circuits are opened, so as to eject the grain from the receptacle and simultaneously therewith to rotate the grain-measuring device so as to receive the quantity of grain from the grain supply, and for causing the receptacle to be swung back to its normal position immediately after the ejection of the grain and to empty the grain in the device into the receptacle when the receptacle has been swung back to its normal position.

14. In a machine for popping corn or other grain, a motor and a heating element connected with a source of electric energy; an agitating arm pivotally mounted so as to be adapted to swing in a virtually horizontal plane; a rotatably mounted, eccentric member, operatively connected with the motor and adapted to engage the agitating arm for causing an oscillative, jerky movement thereof; a grain receptacle tiltably mounted upon the agitating arm and adapted normally to be held in a position so that the grain in the receptacle may be heated by the element; a coin chute having a cut-out part therein; a cam lever having a groove therein; a spring extending from the cam lever and normally adapted to rest in the cut-out part of the coin chute; an insulated, gravity-actuated and circuit-closing lever adapted normally to rest on the spring; insulated contact-members respectively connected with the motor and the heating element, the spring being adapted to be deflected by a coin of a predetermined denomination, passing the cut-out part in the chute, so that the circuit-closing lever is allowed to swing downward and past the spring in order to contact the contact members and thus to close the circuits for the motor and the element; a wheel rotatably connected with the motor and having a projection thereon adapted to engage the groove in the cam lever, the groove being so formed, and the relation between the spring and the circuit-closing lever being such, that, when the projection passes in the initial portion of the groove, the cam lever is swung downward and allows the spring to snap back under the circuit-closing lever, and, when the projection passes in the terminal portion of the groove, the cam lever is swung upward and thereby causes the spring to lift the circuit-closing lever out of contact with the contact members so as to open the circuits; and means connected with the cam lever and co-operating therewith for causing a tilting movement of the grain receptacle over the agitating arm, when the circuits are opened, so as to eject the grain from the receptacle, and for causing the receptacle to be swung back to its normal position immediately after the ejection of the grain.

In testimony whereof I affix my signature.

DANIEL WEBSTER BAKER.